No. 679,196. Patented July 23, 1901.
J. M. TYLER.
TRAP.
(Application filed May 27, 1901.)
(No Model.)
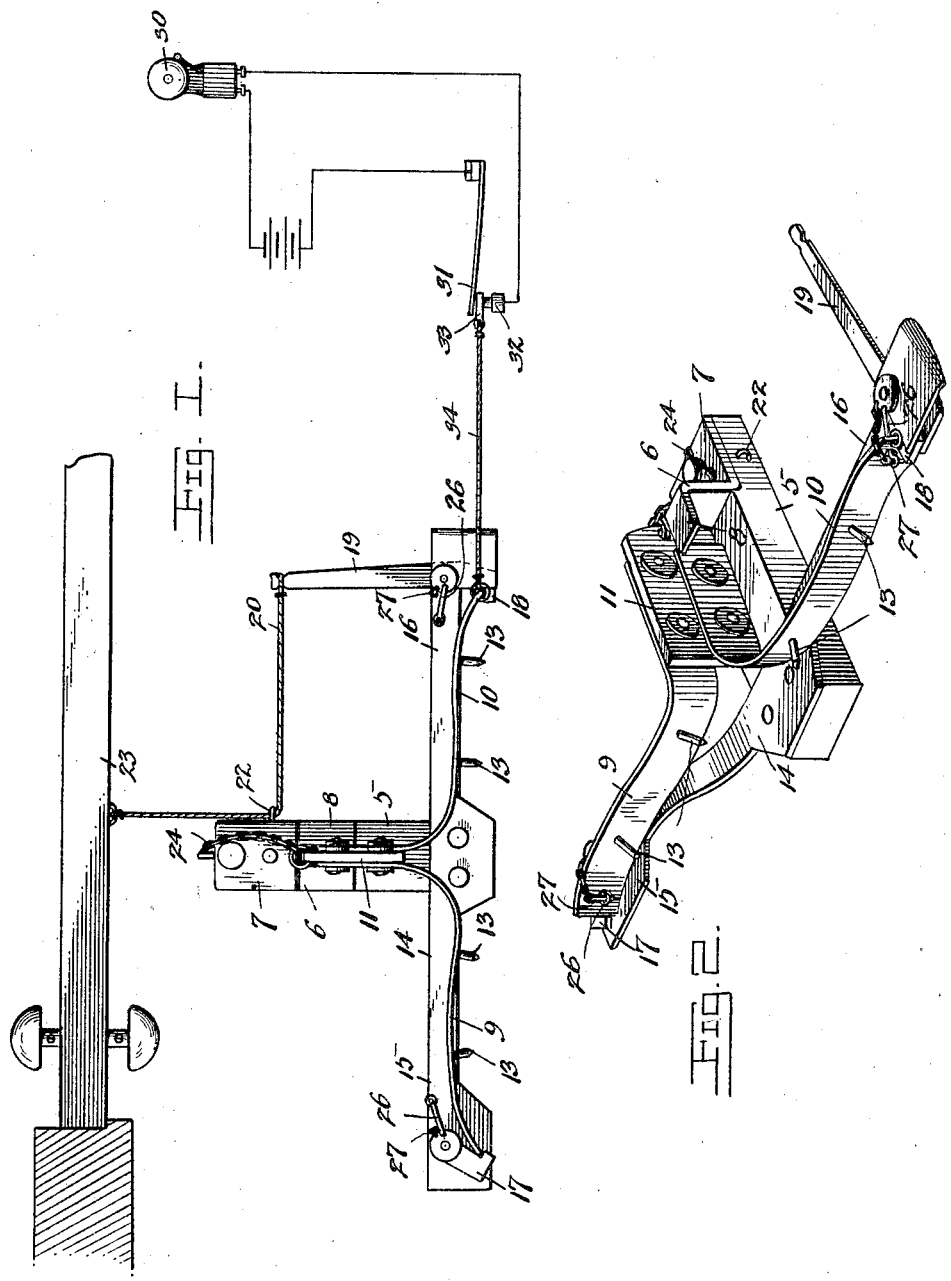
Witnesses
F. E. Alden
Geo. H. Chandler
J. M. Tyler, Inventor
by C. A. Snow & Co.
Attorneys

UNITED STATES PATENT OFFICE.

JAMES M. TYLER, OF BAY ST. LOUIS, MISSISSIPPI.

TRAP.

SPECIFICATION forming part of Letters Patent No. 679,196, dated July 23, 1901.

Application filed May 27, 1901. Serial No. 62,139. (No model.)

*To all whom it may concern:*

Be it known that I, JAMES M. TYLER, a citizen of the United States, residing at Bay St. Louis, in the county of Hancock and State of Mississippi, have invented a new and useful Trap, of which the following is a specification.

This invention relates to traps, and while it is particularly designed for catching burglars it will be understood from the following description that it may also be set for catching various animals.

One object of the invention is to provide a construction of trap that may be set in such manner that when a person attempts to open a drawer or door the trap will be sprung and at the same time an alarm will be sounded, a further object of the invention being to provide a construction wherein the jaws may be held retracted so as not to be sprung.

In the drawings forming a portion of this specification, and in which like numerals of reference indicate similar parts in the several views, Figure 1 is a plan view showing the trap as set, a portion of a door to which it is attached being also shown and the connections with an electrically-operated alarm being illustrated. Fig. 2 is a perspective view showing the trap proper with the jaws held back by means of the safety catches or latches.

Referring now to the drawings, the present trap comprises a supporting-base 5, upon which is a post consisting of a plate 6, having a foot 7 at its lower end, which is secured to the base, and having a head 8 at its upper end, formed by bending the upper end of the plate forwardly over the base, and this head is slotted rearwardly from the front edge thereof.

The jaws of the trap consist of the two spring-plates 9 and 10, which at their inner ends are securely attached to opposite sides of a supporting plate or block 11 of such size as to permit it to fit into the slot of the head of the post, so that the jaws may be moved with their free ends outwardly to set them in the manner hereinafter explained. The two jaws move in different horizontal planes and on their inner faces are provided with gripping teeth or spikes 13, which by engaging the clothing of a burglar prevent him from sliding out from between the jaws. To hold the jaws in open or set positions, the base is provided with a plate 14, having laterally-extending arms 15 and 16, the outer end of the arm 15 being flat and having a hook 17 pivoted thereon for movement into and out of engagement with the end of the jaw, the bill of the hook being straight, however, so that if the block 11 be permitted to move away from the hook the end of the jaw will move from engagement with the hook. The end of the plate-arm 16 is bent upon itself to form a casing, in which is pivoted a second hook 18, having also a straight bill for engagement with the end of the jaw 10, and when the ends of the two jaws are engaged with the ends of their respective hooks the block 11 is held from lateral movement, and the strain of the spring-jaws acts to hold the hooks in their engaging positions. If the hook 18 be moved from engagement with the end of the spring-jaw 10, however, then the block 11 will move away from the hook 17 and the jaw 9 will become disengaged therefrom, so that the jaws may come together. The hook 18 has a stem in the form of a lever 19, which extends rearwardly of the arm 16, and attached thereto is a cord 20, which passes through a guide 22 on the base 5 and thence rearwardly to a door 23, so that when the door is opened the cord will be pulled to operate the lever and draw the hook from the jaw, so that the trap will be sprung. The block 11 is connected to the post 6 by means of a chain 24, so that it cannot be carried away when sprung.

In order that the jaws may be latched in set positions, they are perforated at their outer ends to permit of the passing of links 26 therethrough and which links are attached to the arms 15 and 16, and after being passed through the perforations latch-pins 27 are engaged with their eyes to prevent withdrawal, and with this arrangement should either or both hooks be disengaged from the jaws, the latter will not close.

An alarm is provided to be set off when the trap is sprung, and in the present instance consists of an electric bell 30, having a battery with which it is in circuit, one terminal of the circuit being connected to a spring-finger 31 and the other terminal to a contact 32, disposed therebelow for engagement thereby to close the circuit of the battery through the bell. An insulating-plate 33 is provided and is disposed between the spring-finger and the contact, and attached to this insulating-plate is a cord 34, which is attached also to the end of the jaw 10, so that when said jaw moves when the trap is sprung the insulating-plate will be drawn from between the finger and contact to permit engagement thereof to close the circuit.

The trap may be set at any desired elevation to engage any portion of the burglar, and the cord from the hook 18 may be attached to a money-drawer, window-shutters, or to any other closure that is to be protected. Also in trapping game the trap may be set in the position shown or may be turned on its side, as will be understood.

In practice modifications of the specific construction shown may be made, and any suitable materials and proportions may be used for the various parts without departing from the spirit of the invention.

What is claimed is—

1. A trap comprising bodily-movable spring-jaws mutually connected, movable holding devices for engagement with the jaws to hold them set, and means for moving one of the holding devices from engagement with its jaw to permit of bodily movement of the other jaw from its holding device.

2. A trap comprising movable spring-jaws mutually connected, pivoted hooks for engagement with the jaws to hold them set, each jaw being adapted for movement from its holding-hook when the other jaw is released, and means for moving one of the hooks to release its jaw.

3. A trap comprising bodily-movable spring-jaws mutually connected, and separate means for holding the jaws set, each jaw being adapted for movement from its holding means when the other jaw is released.

4. A trap comprising a slotted post, spring-jaws having a connecting-block at their adjacent ends for engagement with the slot of the post loosely, pivoted hooks for engagement with the ends of the jaws to hold them set, one of the hooks having a lever extending beyond its pivot for moving the hook to release the jaw, and an anchoring connection for the jaws.

5. A trap comprising a base having a slotted post, jaws comprising spring-plates having a connecting-plate at their inner ends for engagement loosely with the slot of the post, laterally-extending arms carried by the base, hooks pivoted upon the arms for movement into and out of engagement with the jaws, said jaws having openings therein, links attached to the arms and adapted for engagement through the openings of the jaws, and pins for engagement with the links beyond the jaws.

6. A trap comprising a slotted post, jaws comprising spring-plates having a connecting-plate at their inner ends for engagement loosely with the slot of the post, pivoted hooks for engagement with the jaws to hold them set, each jaw being movable out of engagement with its hook when the other jaw is disengaged, and means for holding the jaws against operation when the hooks are disengaged therefrom.

In testimony that I claim the foregoing as my own I have hereto affixed my signature in the presence of two witnesses.

JAMES M. TYLER.

Witnesses:
RICHARD MENDES,
W. W. STOCKSTILL.